United States Patent [19]
Imamura et al.

[11] Patent Number: 5,477,329
[45] Date of Patent: Dec. 19, 1995

[54] IMAGE SENSOR HAVING EXTERNALLY MOUNTED CONTROL BOARD

[75] Inventors: Masaya Imamura; Hiromi Ogata, both of Kyoto, Japan

[73] Assignee: Rohm Co., Ltd., Kyoto, Japan

[21] Appl. No.: 6,631

[22] Filed: Jan. 21, 1993

[30]     Foreign Application Priority Data

Jan. 31, 1992  [JP]  Japan ................... 4-016546

[51] Int. Cl.[6] ........................ H04N 1/024; H04N 1/04; H01J 40/14
[52] U.S. Cl. .................. 358/296; 358/482; 250/208.1
[58] Field of Search .................... 358/296, 474, 358/482, 483, 484; 250/208.1; 348/272, 294; 346/76 PH; 347/171

[56]             References Cited

U.S. PATENT DOCUMENTS

| | | | |
|---|---|---|---|
| 4,783,700 | 11/1988 | Nagane .................... | 358/482 X |
| 4,793,812 | 12/1988 | Sussman et al. .......... | 358/285 X |
| 4,905,092 | 2/1990 | Koshiishi et al. ......... | 358/296 |
| 5,038,027 | 8/1991 | Ioka .......................... | 250/208.1 |
| 5,187,596 | 2/1993 | Hwang ..................... | 358/484 |
| 5,254,847 | 10/1993 | Hata et al. ............... | 250/208.1 |

*Primary Examiner*—Peter S. Wong
*Assistant Examiner*—Eric Frahm
*Attorney, Agent, or Firm*—Wolf, Greenfield & Sacks

[57]            ABSTRACT

To provide an image sensor which enables internally mounted electronic parts such as a light receiving element to be protected against adverse affection at assembly of the image sensor, electronic parts in a control block to be easily adjusted after assembly, and the control block to be replaced easily and at low cost conforming to various electrical characteristic requirements, a part of a board containing a light emitting element and/or a light receiving element disposed within a frame is projected from the frame, having a glass cover on the top and side boards on both sides and terminals on one side of a connection terminal block are soldered to the projection of the board and terminals on the other side are soldered to a hybrid unit used as a control block for controlling electric signals of internally mounted electronic parts such as the light emitting and receiving elements. The hybrid unit consists of an electronic parts package and a board to which the package is soldered.

13 Claims, 9 Drawing Sheets

IMAGE SENSOR HAVING EXTERNALLY MOUNTED CONTROL BOARD

BACKGROUND OF THE INVENTION

1. Field of the Invention

This invention relates to image sensors used in facsimile machines, copiers, optical character readers, etc.

2. Description of Related Art

FIG. 1 shows a typical conventional image sensor. FIG. 1 is a transverse sectional view of main parts of the image sensor on a plane perpendicular to the scanning direction. The image sensor is provided with a transparent cover (glass cover) 11 mounted on the top of a frame 10. Within the frame 10, a board 13 is disposed for; 13 containing a light emitting element 12. The element 12 illuminates an object, such as a manuscript (not shown), on the top surface of the glass cover 11. A rod lens array 14 serves as an optical system for converging reflected light from the manuscript. A board 16 contains a light receiving element 15 for receiving the light through the rod lens array 14.

FIG. 2 shows a transverse sectional view of main parts of another image sensor. This image sensor is basically the same as that shown in FIG. 1; a glass cover 11 is mounted on the top of a frame 10. Within the frame 10, there are disposed a board 13 containing a light emitting element 12, a rod lens array 14, and a board 16 containing a light receiving element 15.

Each image sensor as described above has a control block for controlling electric signals of the light emitting element, light receiving element, etc. This control block is usually made up of a package of electronic parts such as variable resistors and capacitors.

The image sensor shown in FIG. 1 includes an electronic parts package 20 soldered by solder 21 to the board 16. The image sensor shown in FIG. 2 includes a hybrid board 26 on which a hybrid electronic parts package 20 is mounted; the hybrid board 26 is located in the space between the bottom of the frame 10 and the board 16, and is electrically connected to a lead frame 27 soldered by solder 28 to the board 16.

However, if the electronic parts package 20 is mounted directly on the board 16 as shown in FIG. 1, solder flux is prone to be scattered on the light receiving element 15 when soldering the package to the board, and there is a chance that the image quality provided by the light receiving element 15 may be degraded.

In both image sensor examples, the electronic parts are located within the frame, thus it is difficult to adjust the electronic parts such as the variable resistors making up the control block after the completion of assembly of the image sensor; if the frame, etc., is subjected to any working process to facilitate adjustments, the production cost increases.

Further, since the electronic parts are mounted within the frame, replacement of the electronic parts is not easy; it is difficult to change the electrical characteristics of the control block for increasing variations of models.

SUMMARY OF THE INVENTION

Accordingly, it is an object of the invention to provide an image sensor which enables internally mounted electronic parts such as a light receiving element to be protected against adverse affection when the image sensor is assembled, particularly when the control block parts are installed, the electronic parts in the control block to be easily adjusted after assembly, and the control block to be replaced easily and at low cost conforming to various electrical characteristic requirements.

To these ends, according to one embodiment of the invention, there is provided an image sensor where a board containing a light emitting block and/or a light receiving block is installed in a Frame with a part of the board projecting outside the frame and a board containing a control block is connected to the projection of that board. This structure enables the projection of the board installed within the frame to function as external connection terminals for external disposition of the control block board. In fact, for example, terminals on one side of a connection terminal block having a plurality of terminals on both sides are connected to the projection of the board installed in the frame and a hybrid board of hybrid electronic parts making up the control block is connected to the terminals on the other side.

Thus, not only are the electronic parts such as the light receiving element installed in the frame not hindered, but also no special treatment needs to be applied to the frame. Since the control block board is located outside the frame, the electronic parts for the control block can be easily adjusted after assembly; in addition, the block can be easily replaced with any one of control block boards having various electrical characteristics. From easy replaceability with another control block board, since the control block board is connected to the projection of the board installed within the frame in the final step of assembly of the image sensor, if a number of image sensors are manufactured to the steps preceding the installation of the control block board and diversified control block boards having various electrical characteristics are provided apart from the incomplete image sensors, image sensors of diversified specifications can be obtained to increase variations of models by selecting any desired control block boards.

DESCRIPTION OF THE PREFERRED EMBODIMENT

Figure 1:
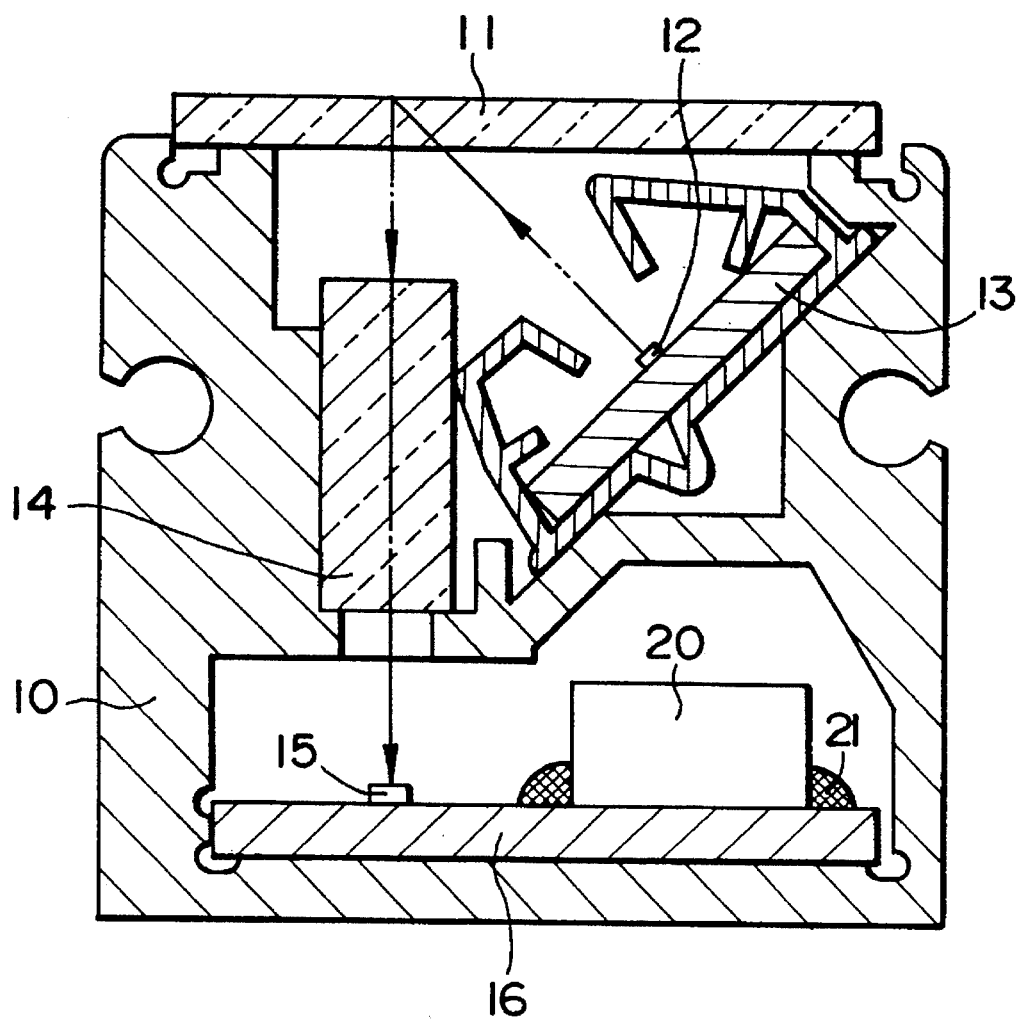
FIG. 1 shows the structure of a conventional image sensor.
Figure 2:
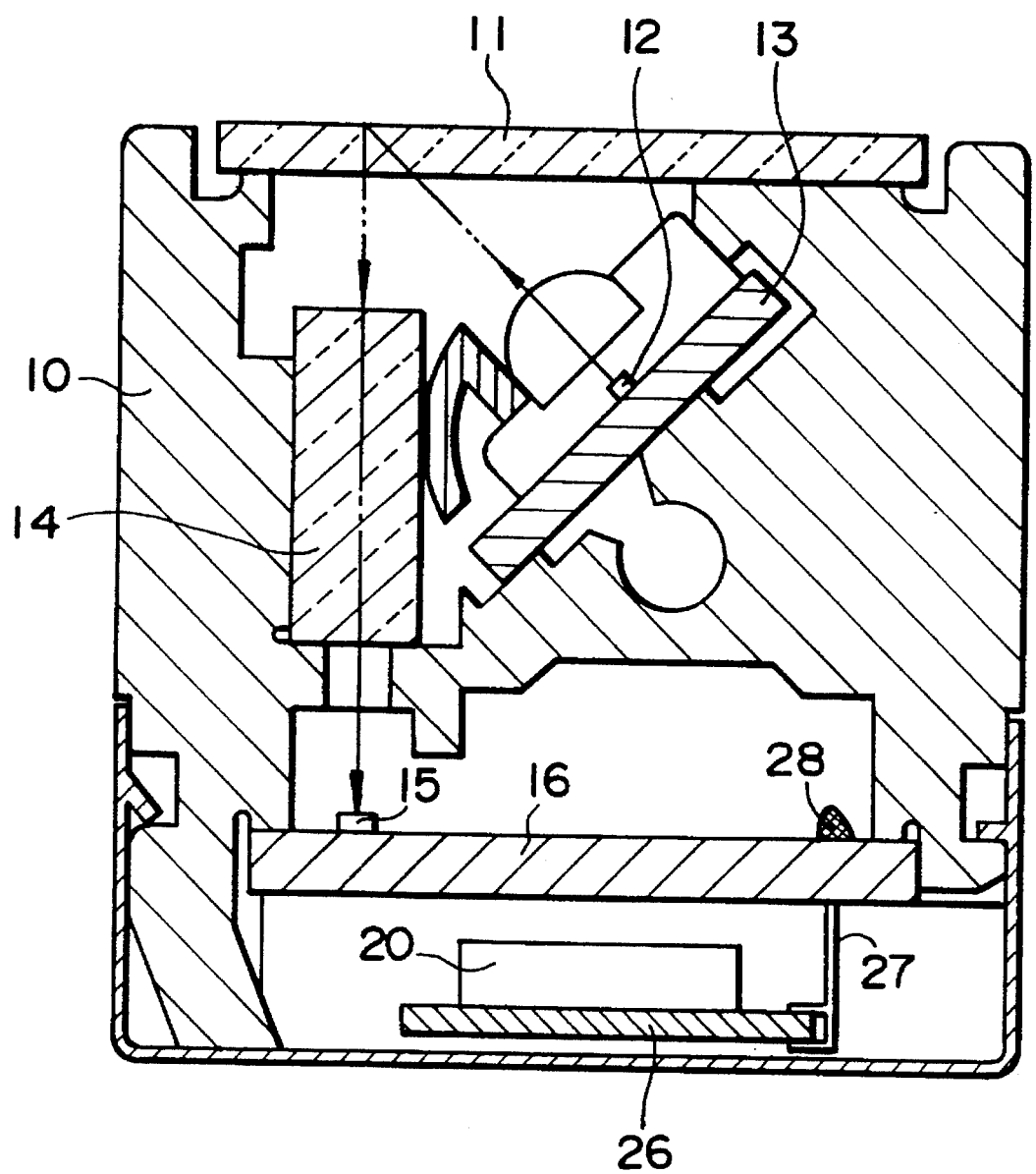
FIG. 2 shows the structure of another conventional image sensor.
Figure 3:
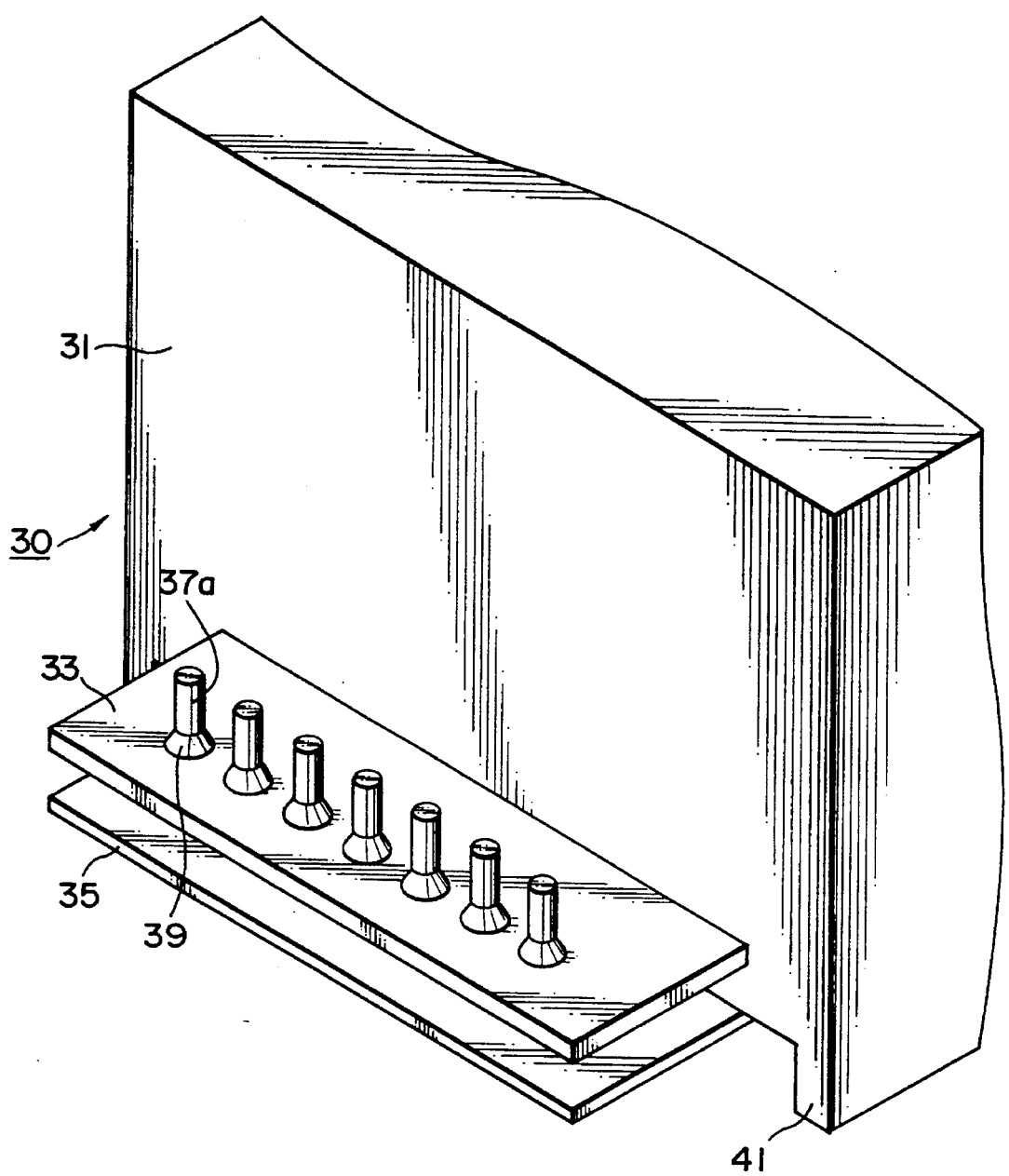
FIG. 3 is a partial perspective view showing the structure of an image sensor according to a preferred embodiment of the invention.

FIG. 3 is a partial perspective view of an image sensor according to a preferred embodiment of the invention. As shown in the figure, the image sensor 30 according to the embodiment comprises a frame 31, a sensor board 33 projecting from the inside of the frame 31, and a control board 35 securely connected to the sensor board 33.

Figure 4:
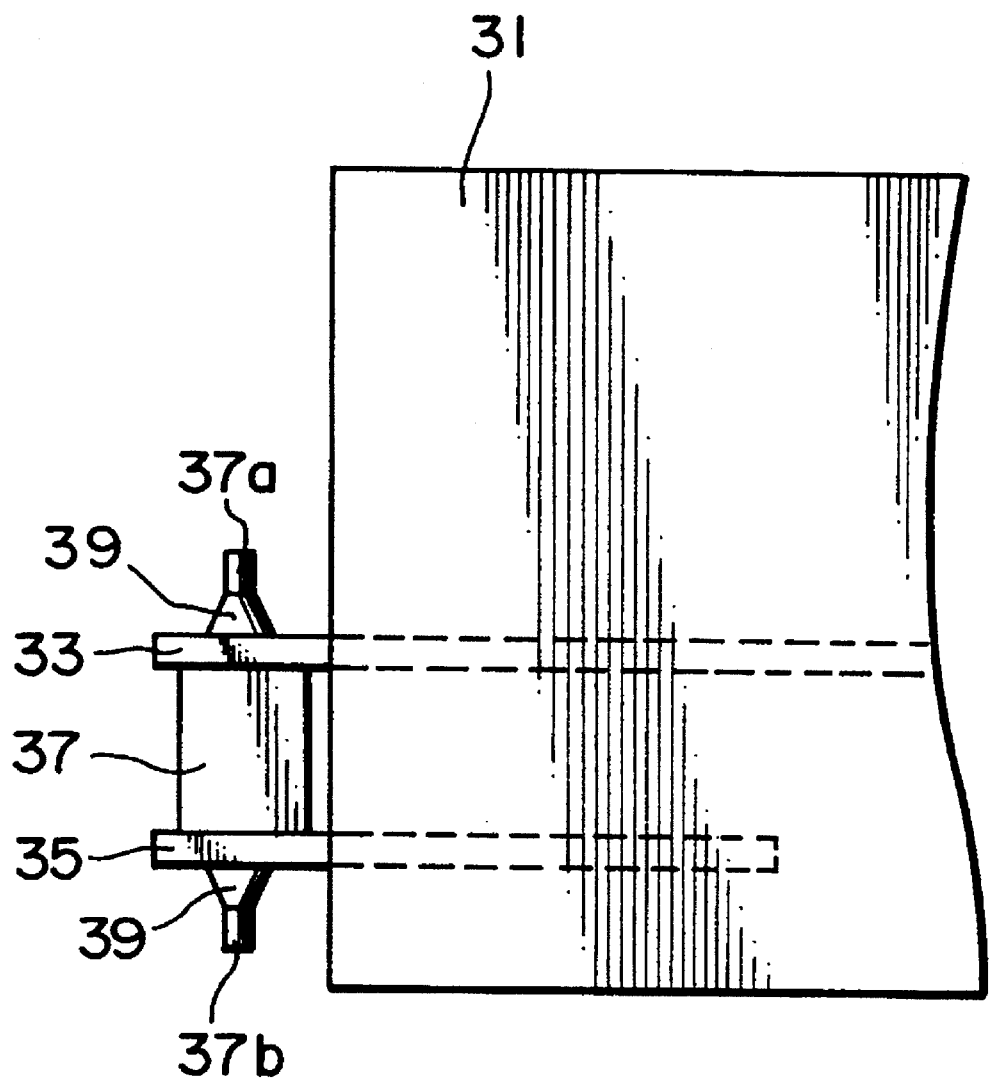
FIG. 4 is a fragmentary side view of the image sensor of the embodiment.
Figure 5:
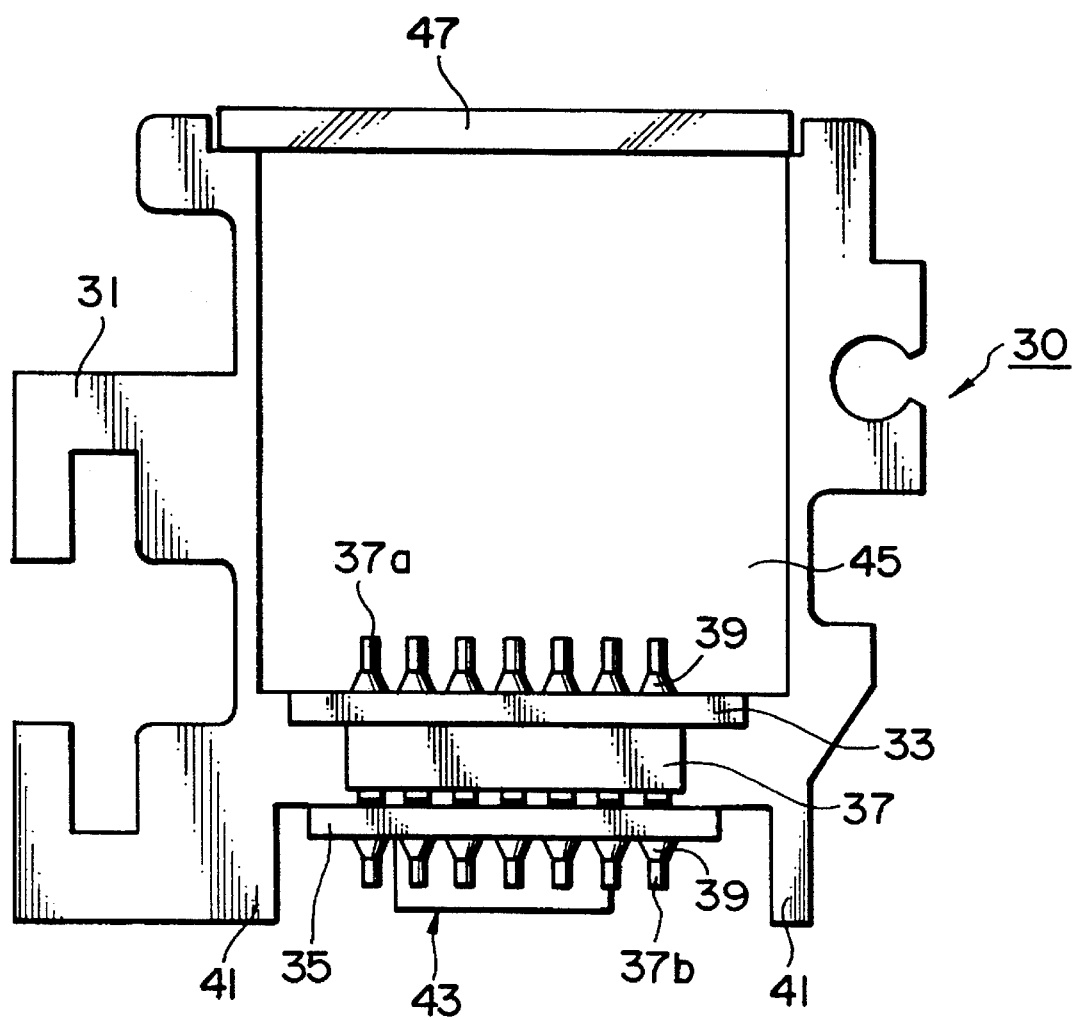
FIG. 5 is an elevational view of the image sensor of the embodiment.

As shown in FIG. 4 which is a fragmentary side view of the image sensor, the sensor board 33 and the control board 35 are connected by connection means 37. One end of the connection means 37 is projected out through the sensor board 33 to form a sensor board terminal 37a; the other end is projected out through the control board 35 to form a control board terminal 37b. The sensor and control board terminals 37a and 37b are secured by solder 39 for securely connecting the sensor board 33 and the control board 35. Thus, these boards 33 and 35 are physically secured and electrically connected to each other. As shown in FIG. 4, in the embodiment, a large portion of the sensor board 33 is contained in; the frame 31, but the control board 35 is exposed below the frame 31 and is shorter than the frame 31. As shown in FIG. 5 which is an elevational view of the image sensor, in the embodiment, the frame 31 is provided with a protective wall 41 to protect the control board 35 exposed at the bottom surface of the frame 31.

The image sensor of the embodiment as shown above has the feature of the sensor board 33 whose one end is projected (or exposed) from the frame 31 for connection of the control board 35 in the exposure portion, as described above. Since the control board 35 is exposed outside the frame 31, the control board 35 (electronic parts used for control) can be incorporated after electronic parts other than those mounted on the control board 35 have been built into the frame 31 of the image sensor.

In the embodiment, the electronic parts for controlling the electric signals of the internal electronic parts such as an light emitting element and light receiving element mounted within the image sensor are soldered as a hybrid unit to the control board 35.

Figure 6:
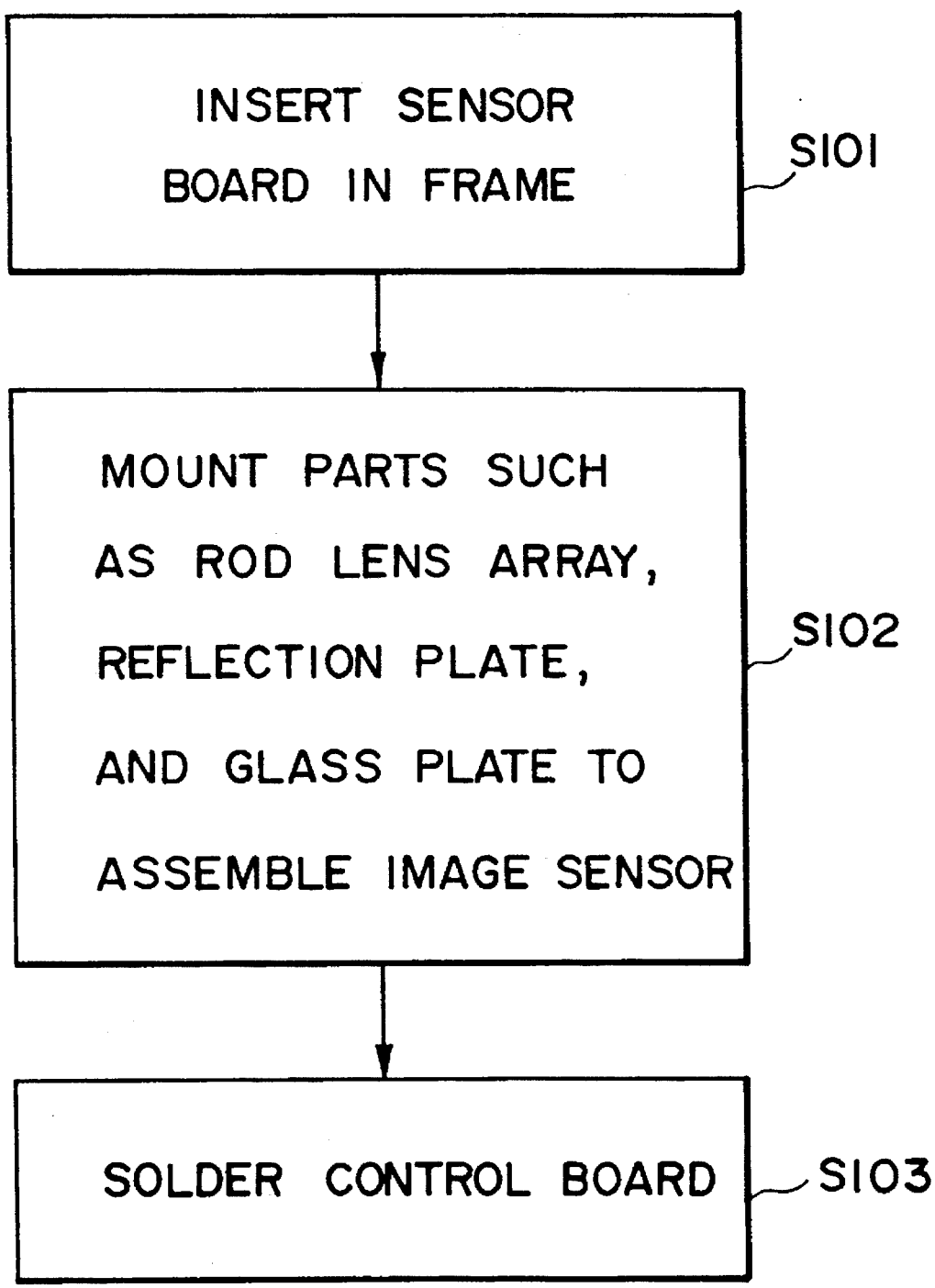
FIG. 6 is a flowchart showing a flow of a production process of the image sensor of the embodiment.
Figure 7:
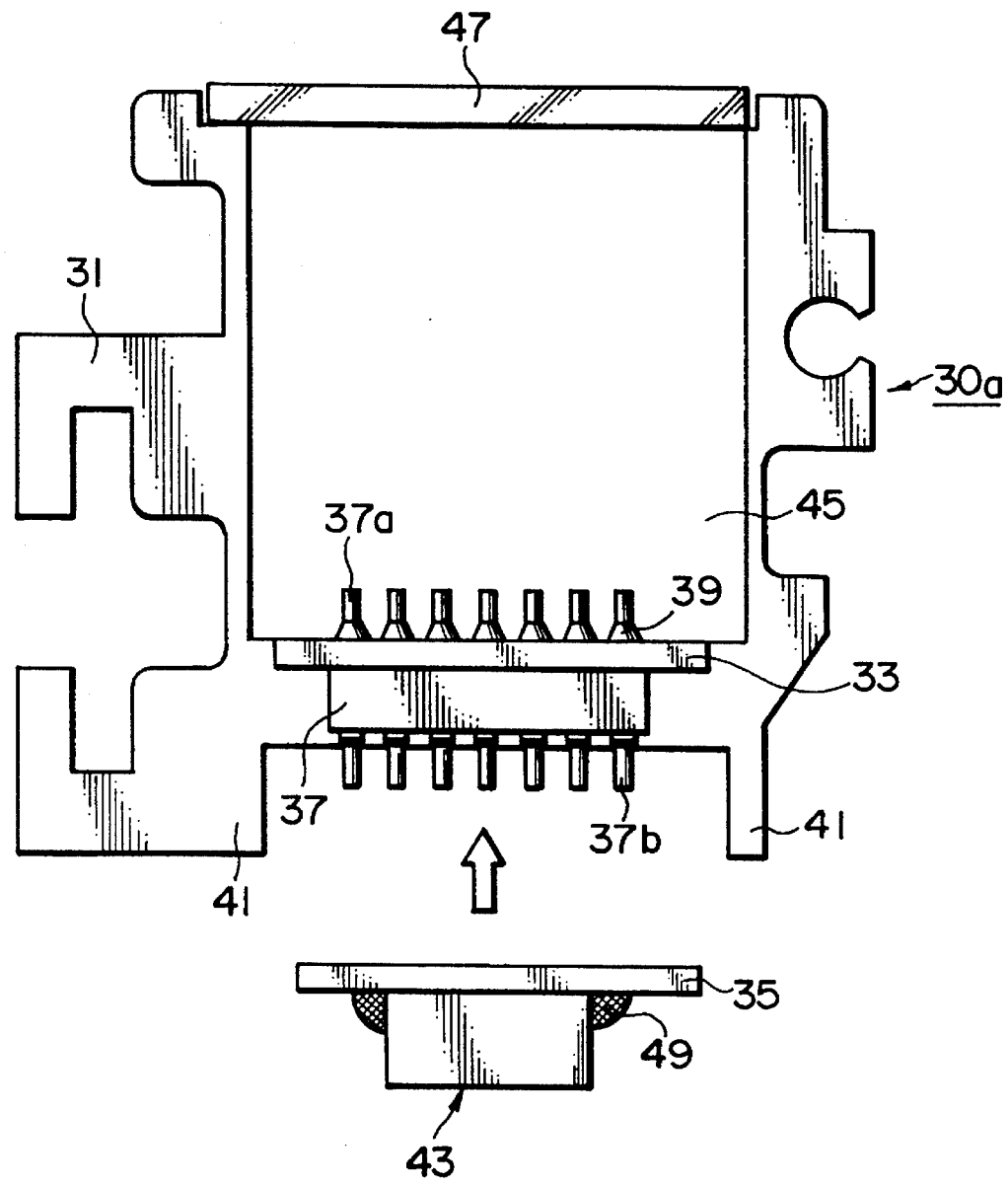
FIG. 7 is an illustration of production steps of the image sensor of the embodiment.

Now, the production process of the image sensor 30 according to the embodiment is described in conjunction with FIGS. 6 and 7.

FIG. 6 is a flowchart showing an operation flow of the production process. At step S101, first a sensor board 33 is inserted into a frame 31. Next, at step S102, parts such as a rod lens array, reflection plate, light receiving element, and light emitting element are mounted within the frame and further side boards 45 and a glass plate 47 are secured to complete the assembling of a main unit 30a of the image sensor 30. Then, at step S103, a control board 35 with a hybrid unit 43 secured thereto by solder 49 is attached to the main unit 30a so as to form the image sensor 30. The production process as described above cannot be implemented until the structure of the image sensor 30 according to the embodiment is adopted. In the production process, the parts such as the light receiving and emitting elements are mounted, then sealed up by the side boards 45 before the control board 35 is secured to the main unit, thus the scattering of solder flux on the light receiving and emitting elements can be prevented when the control board 35 is installed and electrically connected by the solder 39 with the sensor board 33.

Figure 8:
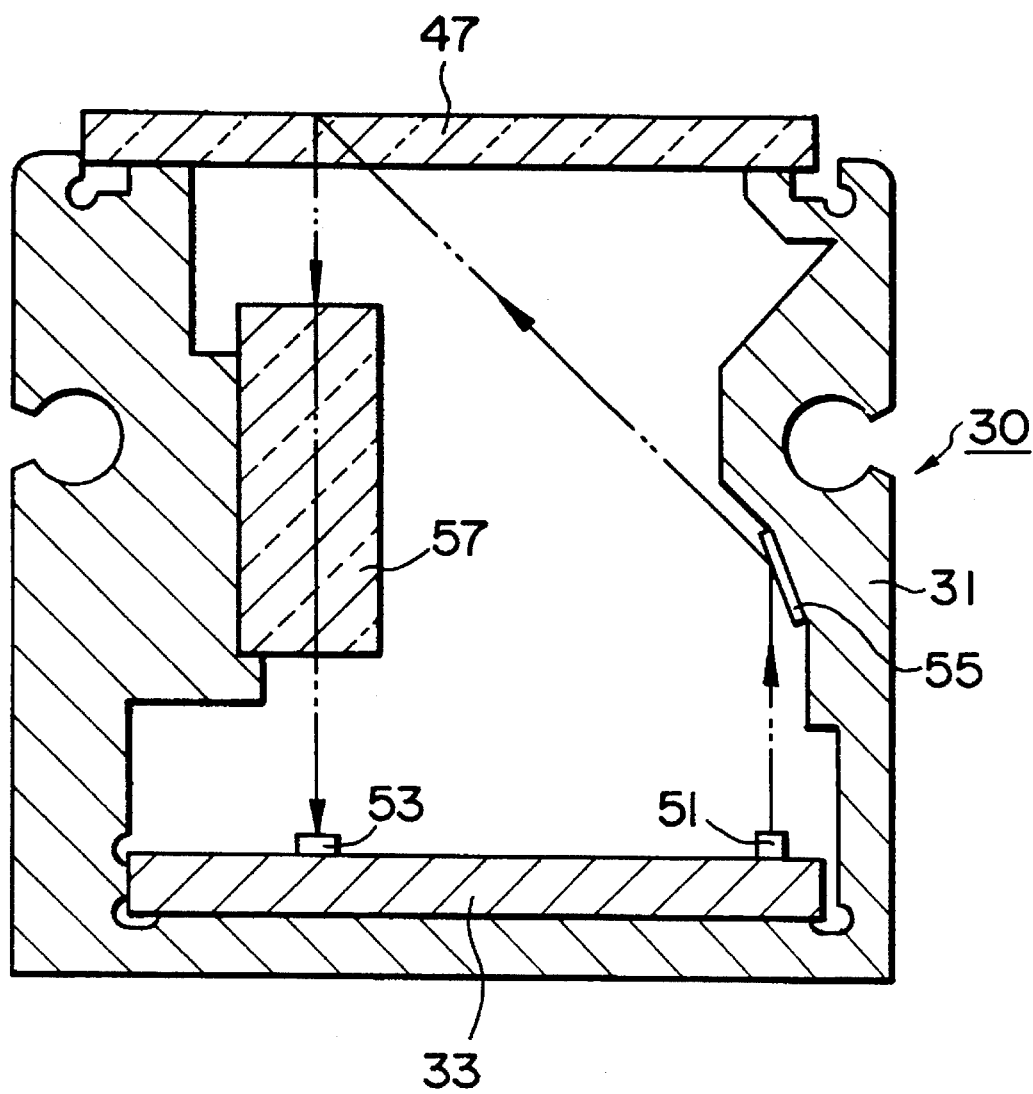
FIG. 8 shows the structure of the image sensor of the embodiment.

FIG. 8 is a sectional view for illustrating a preferred structure of the image sensor 30 according to the embodiment of the invention.

The image sensor 30 is formed with a light emitting element 51 and a light receiving element 53 mounted on a sensor board 33. Light emitted from the light emitting element 51 is reflected by means of a mirror 55, thereby passing the light of the light emitting element 51 through a glass plate 47 for illuminating a manuscript. The light reflected from the manuscript is guided to a rod lens array 57 for converging on the light receiving element 53. This light receiving element 53 is responsive to a change in the converged light for outputting an electric signal, thereby converting a pattern on the manuscript into electric signals. Although both the light emitting element 51 and the light receiving element 53 are mounted on the sensor board 33 in the embodiment, these elements may be mounted on separate boards which are electrically connected to each other. In any event, if a part of one end of the sensor board 33 is extending externally from a frame 31 for secure connection of the sensor board 33 to a control board 35 in the exposure portion, the electronic parts within the frame may be located as desired. Since the control board 35 is connected to the main unit lastly to complete the image sensor 30, the type of hybrid unit 43 containing the electronic parts for control can be easily changed. In addition, even if any of the electronic parts for control contained in the hybrid unit 43 goes out of order, easy replacement can be made. Therefore, a printer including the image sensor 30 can be easily repaired even if the image sensor fails.

Figure 9:
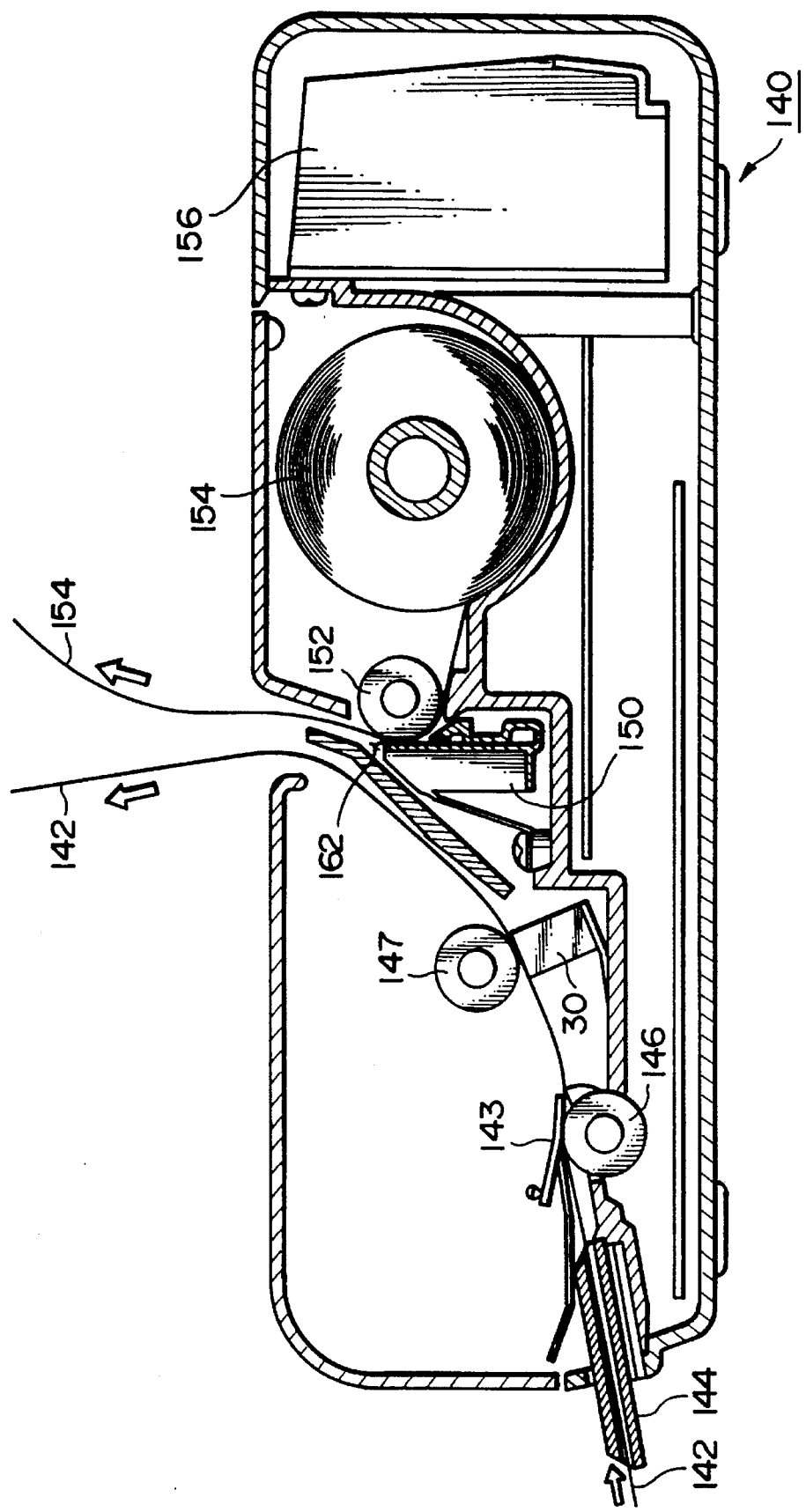
FIG. 9 is a sectional view of the configuration of a printer into which the image sensor of the embodiment is built.

FIG. 9 shows the configuration of a printer 140 containing the image sensor 30 according to the embodiment of the invention. The printer 140 comprises an inlet slot 144 through which paper 142 is inserted, a feed roller 146 for transporting the paper, an image sensor 30 for reading the paper contents, a printing section 150 for printing, and a record platen roller 152 contiguous to the printing section 150 for printing on record forms 154. The printer uses the energy of a power supply 156 for operation. When paper 142 is inserted through the inlet slot, the paper is separated by separation means 143 into sheets for feeding to the image sensor 30. Then, the image sensor 30 converts patterns on the paper 142 into electric signals in response to which the printing section 150 prints on the record forms 154. The printer uses an ink ribbon 162 in order to enable printing on rough paper.

The image sensor according to the embodiment can be easily produced and there is little chance that the image sensor will be damaged in the production steps, as described above. As a result, the printer 140 comprising the image sensor 30 can be built at a lower cost than conventional printers. If different types of hybrid units are provided apart from the image sensor 30 of the embodiment, image sensors of different types can be easily produced, thus the characteristics of the printer 140 can be easily changed. Since the control board 35 is connected to an outer portion of the frame 31 (the image sensor main unit 30a), even if the hybrid unit 43 goes out of order, easy replacement can be made For convenience of maintenance. Further, since a connector can also be mounted on the hybrid unit 43, if the type or connection direction of connection means 37 is changed, the hybrid unit 43 can be connected from the various directions by the connector. Thus, the connection direction of the hybrid unit 43 can be changed properly for changing the building-in position or size of the image sensor 30 to enable the size and form of the printer 140 to be made flexible.

As described above, the board containing a light emitting block and/or a light receiving block is installed in the frame with a part of the board projecting outside the frame and the board containing the control block for controlling the electric signals of the light emitting and receiving blocks is connected to the projection of that sensor board, thus the image sensor of the invention provides the following merits:

(1) Since the control block board can be disposed outside the frame, the internal electronic parts such as the light receiving block in the frame are not adversely affected when the control block board is soldered to the projection of the sensor board;

(2) If no special treatment is applied to the frame, the control block can be easily adjusted after the image sensor is assembled; and (3) If a number of image sensors are manufactured to the steps preceding the installation of the control block board and several kinds of control block boards having various electrical characteristics are provided apart from the incomplete image sensors, image sensors having desired electrical characteristics can be obtained easily and at low cost to make rich variations of models simply by selecting any desired control block boards in the final step.

Although the invention has been described in its preferred form, it is understood that the invention is not limited to the specific embodiments thereof and the combination and arrangement of parts may be resorted to without departing from the spirit and scope of the invention as hereinafter claimed.

What is claimed is:

1. An image sensor comprising:

an optical system;

a frame enclosing said optical system;

a sensor board connected to said optical system, said sensor board being disposed within said frame so that a portion of the sensor board extends externally from said frame; and control means disposed externally of said frame and connected to said portion of said sensor board for controlling said optical system.

2. The image sensor of claim 1, wherein the control means includes a control board having terminals connected to terminals on said portion of said sensor board.

3. The image sensor of claim 2, wherein said control board is mounted to said portion of said sensor board by said terminals.

4. The image sensor of claim 3, wherein said terminals extend through holes in said portion of said sensor board and through holes in said control board.

5. An image sensor used in an electronic device, comprising:

a frame;

a transparent cover supported on the frame for contacting an object;

a light emitting block installed in the frame for emitting light against the object;

a light receiving block installed in the frame for receiving light reflected from the object;

a sensor board partially installed in the frame for supporting the light receiving block, an end of the sensor board extending externally from the frame; and a control board disposed outside the frame for controlling the light emitting block and the light receiving block, the control board being electrically connected to said end of the sensor board by solder.

6. The image sensor as claimed in claim 5 wherein said frame includes protective walls extending externally from said frame on opposing sides of said control board.

7. The image sensor as claimed in claim 6 wherein said light emitting block and said light receiving block are mounted on said sensor board.

8. The image sensor as claimed in claim 7 wherein said sensor board is of a through hole mount type having through holes extending through said sensor board at said end extending externally to said frame, wherein said control board is of a through hole mount type having through holes extending through said control board, and wherein said image sensor further comprises terminals extending through the through holes of said sensor board and the through holes of said control board and being soldered to said sensor board and said control board.

9. The image sensor of claim 5, wherein said electronic device is one of a printer, a wordprocessor, a facsimile machine and a plotter.

10. A printing device comprising:

a first feed means for feeding a manuscript;

a second feed means for feeding an ink ribbon;

a third feed means for feeding print forms; and an image sensor for converting a pattern on a face of said manuscript into electrical signals; and a thermal head for generating heat in response to said electrical signals and printing the pattern on the print forms with an ink of the ink ribbon;

wherein said image sensor includes:

a frame;

a transparent cover supported on the frame for contacting an object;

a light emitting block installed in the frame for emitting light against the object;

a light receiving block installed in the frame for receiving light reflected from the object;

a sensor board partially installed in the frame for supporting the light receiving block, an end of the sensor board extending externally from the frame; and a control board disposed outside the frame for controlling the light emitting block and the light receiving block, the control board being electrically connected to said end of the sensor board by solder.

11. The printing device as claimed in claim 10 wherein said frame of said image sensor includes protective walls extending externally from said frame on opposing sides of said control board.

12. The printing device as claimed in claim 11 wherein said light emitting block and said light receiving block are mounted on said sensor board of said image sensor.

13. The printing device as claimed in claim 12 wherein said sensor board of said image sensor is of a through hole mount type having through holes extending through said sensor board at said end extending externally to said frame, wherein said control board of said image sensor is of a through hole mount type having through holes extending through said control board, and wherein said image sensor further comprises terminals extending through the through holes of said sensor board and the through holes of said control board and being soldered to said sensor board and said control board.

* * * * *